(12) United States Patent
Zhang et al.

(10) Patent No.: US 8,478,926 B1
(45) Date of Patent: Jul. 2, 2013

(54) CO-PROCESSING ACCELERATION METHOD, APPARATUS, AND SYSTEM

(71) Applicant: Huawei Technologies Co., Ltd., Guangdong (CN)

(72) Inventors: Xiaofeng Zhang, Hangzhou (CN); Fan Fang, Hangzhou (CN); Ling Qin, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/622,422

(22) Filed: Sep. 19, 2012

Related U.S. Application Data (63) Continuation of application No. PCT/CN2011/083770, filed on Dec. 9, 2011.

(51) Int. Cl.
*G06F 13/36* (2006.01)

(52) U.S. Cl.
USPC .......................................... 710/310; 709/245

(58) Field of Classification Search
USPC ............................ 710/310; 709/245, 212–216
See application file for complete search history.

(56) References Cited

U.S. PATENT DOCUMENTS

| | | | |
|---|---|---|---|
| 6,484,224 B1 * | 11/2002 | Robins et al. | 710/305 |
| 7,082,502 B2 * | 7/2006 | Najam et al. | 711/147 |
| 7,240,182 B2 * | 7/2007 | Day et al. | 712/34 |
| 8,296,764 B2 * | 10/2012 | Heidari-Bateni et al. | 718/100 |
| 2002/0095562 A1 | 7/2002 | Nakanishi et al. | |
| 2006/0010305 A1 | 1/2006 | Maeda et al. | |

FOREIGN PATENT DOCUMENTS

| | | |
|---|---|---|
| CN | 1642138 | 7/2005 |
| CN | 1749955 | 3/2006 |

OTHER PUBLICATIONS

International Search Report issued Sep. 20, 2012 in corresponding International Patent Application No. PCT/CN2011/083770.

* cited by examiner

*Primary Examiner* — Paul R Myers
(74) *Attorney, Agent, or Firm* — Staas & Halsey LLP (57) ABSTRACT

An embodiment of the present invention discloses a co-processing acceleration method, including: receiving a co-processing request message which is sent by a compute node in a computer system and carries address information of to-be-processed data; according to the co-processing request message, obtaining the to-be-processed data, and storing the to-be-processed data in a public buffer card; and allocating the to-be-processed data stored in the public buffer card to an idle co-processor card in the computer system for processing. An added public buffer card is used as a public data buffer channel between a hard disk and each co-processor card of a computer system, and to-be-processed data does not need to be transferred by a memory of the compute node, which avoids overheads of the data in transmission through the memory of the compute node, and thereby breaks through a bottleneck of memory delay and bandwidth, and increases a co-processing speed.

29 Claims, 5 Drawing Sheets

PRIOR ART

CO-PROCESSING ACCELERATION METHOD, APPARATUS, AND SYSTEM

CROSS-REFERENCE TO RELATED APPLICATIONS

This application is a continuation of International Application No. PCT/CN2011/083770, filed on Dec. 9, 2011, which is hereby incorporated by reference in its entirety.

FIELD OF THE INVENTION

The present invention relates to the computer field, and in particular, to a co-processing acceleration method, an apparatus, and a system.

BACKGROUND OF THE INVENTION

With the development of computer technologies, computers are applied in increasingly wider fields. In addition to common computer office applications in everyday life, the computers are also applied in some very complex fields, such as large-scale scientific computing and massive data processing, which usually have higher requirements on the processing capability of the computers. However, the processing capability of a single computer is limited, and is likely to become a bottleneck of improving system performance in the foregoing large-scale computing scenarios, and this problem is effectively solved as a cluster system emerges. The so-called cluster system is a high-performance system formed of multiple autonomous computers and relevant resources which are connected through a high-speed network, in which each autonomous computer is called a compute node. In a cluster, a CPU (central processing unit, central processing unit) of each compute node is designed as a general-purpose computing device, and therefore in some specific application fields, such as image processing and audio processing, processing efficiency is usually not high, so that many coprocessors emerge, such as a network coprocessor, a GPU (Graphics processing unit, graphics processing unit), and a compression coprocessor. These coprocessors may aid the compute node in task processing, that is, co-processing. A task where a coprocessor aids the compute node in processing is called a co-processing task. In a scenario of massive computation of the large-scale computer system, how to use the coprocessor to aid the compute node in co-processing has direct relation to the work efficiency of a computer system.

In the prior art, a coprocessor is mostly added into a computer system in a manner of a PCIE (Peripheral Component Interconnect Express, peripheral component interconnect express) co-processor card, a compute node of the computer system controls the coprocessor to process a co-processing task, and meanwhile a memory of the compute node is used as a data transmission channel of a co-processor card and the compute node, so as to transfer to-be-processed data and data which has been completely processed through the co-processor card.

By adopting such architecture in the prior art, all to-be-processed data has to be transferred through the memory of the computer node, which increase memory overheads, and due to the limits of factors such as the memory bandwidth and delay, a co-processing speed is not high.

SUMMARY OF THE INVENTION

Embodiments of the present invention provide a computer system, a co-processing acceleration method, a co-processing task management apparatus, and an acceleration management board, so as to reduce memory overheads of a computer system and increase a co-processing speed of a coprocessor in the computer system.

An embodiment of the present invention provides a computer system, including: at least one compute node, a bus exchanger, and at least one co-processor card, where the computer system further includes: a public buffer card and a co-processing task management apparatus; the public buffer card provides temporary storage for data transmission between each compute node and each co-processor card in the computer system; the public buffer card and the at least one co-processor card are interconnected through the bus exchanger;

the compute node is configured to send a co-processing request message; and the co-processing task management apparatus is configured to: receive the co-processing request message, where the co-processing request message carries address information of to-be-processed data, and the to-be-processed data is data on which processing is requested by the compute node; according to the address information which is of the to-be-processed data and carried in the co-processing request message, obtain the to-be-processed data, and store the to-be-processed data in the public buffer card; and allocate the to-be-processed data stored in the public buffer card to an idle co-processor card in the computer system for processing.

An embodiment of the present invention provides a co-processing acceleration method, including:

receiving at least one co-processing request message sent by a compute node in a computer system, where the co-processing request message carries address information of to-be-processed data, and the to-be-processed data is data on which processing is requested by the compute node;

according to the address information which is of the to-be-processed data and carried in the co-processing request message, obtaining the to-be-processed data, and storing the to-be-processed data in a public buffer card; where the to-be-processed data is data on which processing is requested by the co-processing request message; and allocating the to-be-processed data stored in the public buffer card to an idle co-processor card in the computer system for processing.

An embodiment of the present invention provides a co-processing task management apparatus, including:

a message receiving module, configured to receive at least one co-processing request message sent by a compute node in a computer system, where the co-processing request message carries address information of to-be-processed data, and the to-be-processed data is data on which processing is requested by the compute node;

a first data transfer module, configured to, according to the address information which is of the to-be-processed data and carried in the co-processing request message, obtain the to-be-processed data, and store the to-be-processed data in a public buffer card; where the to-be-processed data is data on which processing is requested by the co-processing request message; and a second data transfer module, configured to allocate the to-be-processed data stored in the public buffer card to an idle co-processor card in the computer system for processing.

An embodiment of the present invention provides an acceleration management board, including: a controller and a PCIE interface unit; where, the controller is coupled in data connection to a bus exchanger of a computer system through the PCIE interface unit; the controller is configured to receive at least one co-processing request message sent by a central processing unit CPU of the computer system, where the co-processing request message carries address information of to-be-processed data, and the to-be-processed data is data on which processing is requested by the CPU; and according to the address information which is of the to-be-processed data and carried in the co-processing request message, obtain the to-be-processed data from a hard disk in the computer system; and store the to-be-processed data in a public buffer unit; and the controller is further configured to allocate the to-be-processed data stored in the public buffer unit to an idle GPU acceleration card in the computer system for processing, and the GPU acceleration card is connected, through its own first PCIE interface, to the bus exchanger of the computer system.

In the embodiments of the present invention, through the foregoing technical solutions, a public buffer card is used as a public data buffer channel between each compute node and each co-processor card of a computer system, and to-be-processed data does not need to be transferred by a memory of the compute node, which avoids overheads of the to-be-processed data in transmission through the memory of the compute node, breaks through a bottleneck of memory delay and bandwidth, and increases a co-processing speed of the to-be-processed data.

BRIEF DESCRIPTION OF THE DRAWINGS

To illustrate technical solutions in embodiments of the present invention or in the prior art more clearly, accompanying drawings used in the description of the embodiments or the prior art are briefly introduced in the following. Evidently, the accompanying drawings in the following description are only some embodiments of the present invention, and persons of ordinary skill in the art may obtain other drawings according to these accompanying drawings without creative efforts.

DETAILED DESCRIPTION OF THE EMBODIMENTS

Technical solutions in embodiments of the present invention are hereinafter described clearly and completely with reference to accompanying drawings in the embodiments of the present invention. Apparently, the described embodiments are only some rather than all of the embodiments of the present invention. All other embodiments obtained by persons of ordinary skill in the art based on the embodiments of the present invention without creative efforts fall within the protection scope of the present invention.

In order to make persons of ordinary skill in the art better understand the technical solutions provided by the embodiments of the present invention, a co-processing system and a co-processing solution in the prior art are introduced.

Figure 1:
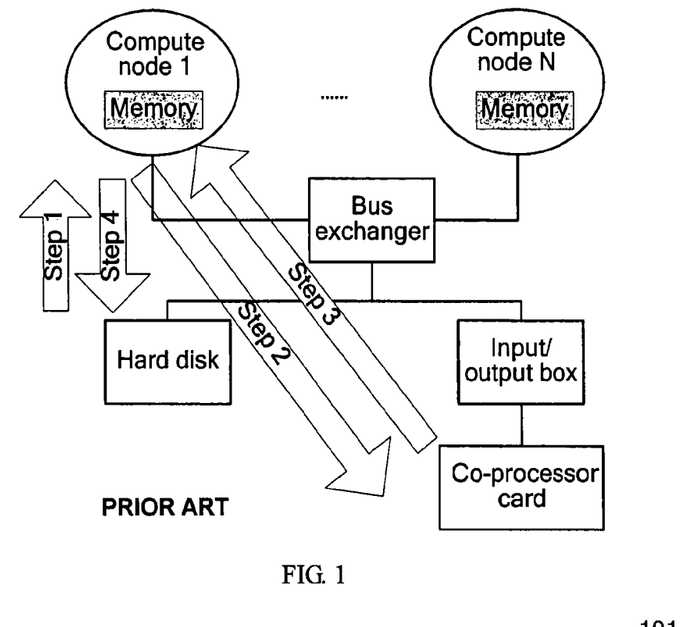
FIG. 1 is an architectural diagram of a co-processing system in the prior art.

As shown in FIG. 1, according to a solution in the prior art, a co-processor card is placed on an input/output box through a PCIE interface, to help a compute node complete a co-processing task. The input/output box is coupled in data connection to the compute node through a PCIE bus exchanger. Step 1: Compute node 1 copies data from a hard disk to a memory of the compute node 1. Step 2: Compute node 1 uses a DMA (Direct Memory Access, direct memory access) technology to copy data from the memory of compute node 1 to a memory of a co-processor card for processing. Step 3: Compute node 1 uses the DMA to copy the processed data from the memory of the co-processor card to the memory of compute node 1. Step 4: The compute node 1 performs further processing on the data or re-saves the data in the hard disk.

Figure 2:
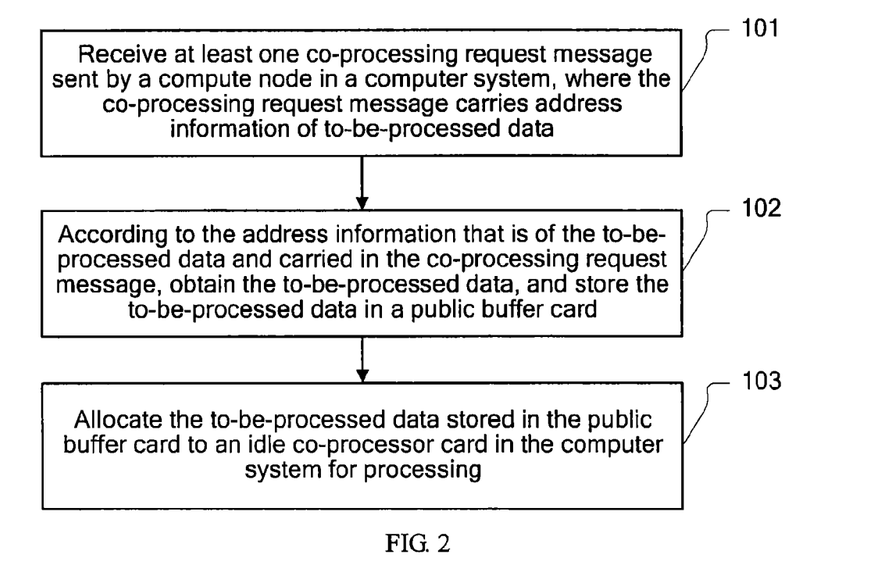
FIG. 2 is a flow chart of a co-processing acceleration method according to Embodiment 1 of the present invention.

The technical solutions provided by the embodiments of the present invention may be applied in various massive computation scenarios such as a large-scale computing device of multi-processor architecture, cloud computing, and a CRAN (cloud radio acess net, cloud radio access net) service. As shown in FIG. 2, Embodiment 1 of the present invention provides a co-processing acceleration method, which is used to increase a speed of co-processing in a computer system. According to FIG. 2, the method includes:

S101: Receive at least one co-processing request message sent by a compute node in a computer system, where the co-processing request message carries address information of to-be-processed data.

It should be noted that, the to-be-processed data is data on which processing is requested by the compute node through the co-processing message, and explanations about to-be-processed data in all embodiments of the present invention are all the same as this.

Specifically, in the computer system, at least one compute node and at least one co-processor card exist. The co-processor card may aid the compute node in task processing, that is, co-processing. When the compute node needs aid of the co-processor card in task processing, the compute node sends a co-processing request message. In an embodiment, the co-processing request message may be a data packet including several fields.

In an embodiment, the co-processing request message specifically includes, but is not limited to, the following information:

1. Request compute node identifier;

In a computer system, at least one compute node exists, and a request compute node identifier is used to identify and distinguish a compute node which initiates a service request. Specifically, each compute node in the computer system may be allocated a unique ID number, and when a certain compute node sends a co-processing request message, an ID number of the compute node is used as a request compute node identifier.

2. Request type;

A request type is used to indicate a co-processing type requested by a compute node. Common co-processing types include: a graphics processing type, a floating-point operation type, a network type, and a Hash operation type. Specifically, a field in a co-processing request message may be used to indicate the request type. For example, a request type field being graphic indicates the graphics processing type, a request type field being float indicates the floating-point operation type, a request type field being net indicates the network type, and a request type field being Hash indicates the Hash operation type. It should be noted that, in a computer system, one or more types of co-processor card may be configured, and therefore, an allowable request type needs to be determined according to the type of a co-processor card configured in the current computer system. For example, in an embodiment, only one type of co-processor card such as a GPU acceleration card may be configured in a system, and in this case, the request type includes only the graphics processing type; in another embodiment, multiple types of co-processor cards, such as a floating-point operation co-processor card, a Hash operation co-processor card, a network co-processor card and a GPU acceleration card, may be configured in a system at the same time, and in this case, the request type correspondingly includes the floating-point operation type, the Hash operation type, the network type, the graphics processing type and so on, which is not specifically limited in the embodiments of the present invention.

3. Address information of to-be-processed data

In an embodiment, address information of to-be-processed data may include a source address and a length of the to-be-processed data.

The source address indicates a starting address of a storage space where data waiting to be processed by a co-processor card (that is, to-be-processed data) is located. In an embodiment, the source address may be a certain address in a non-volatile storage device of a computer system. Further, the non-volatile storage device may be a hard disk or a flash (a flash memory). It should be noted that, the hard disk may specifically include a magnetic disk type hard disk and a solid state type hard disk (such as a flash SSD and a PCMSSD).

The length of the to-be-processed data indicates the size of a storage space required by the to-be-processed data.

4. Destination address

A destination address is a final storage address of data which has been completely processed by a co-processor card. In an embodiment, the destination address may be a certain address in a hard disk of a computer system, for example, a certain address in a hard disk. It should be noted that, the hard disk may specifically include a magnetic disk type hard disk and a solid state type hard disk (such as a flash SSD and a PCMSSD).

5. Request priority

Request priority is designated by a compute node according to the nature, degree of urgency, or origin of a co-processing task. In an embodiment, the request priority may be divided into three levels, high, medium, and low. Definitely, it can be understood that in another embodiment, the priority may further be divided into more levels, such as extremely high, high, ordinary, normal, low, extremely low, and may also be priority levels represented by Arabic numbers 1, 2, 3 and so on, which is not specifically limited in this embodiment.

In an embodiment, information such as the request compute node identifier, the request type, the source address, the length of the to-be-processed data, the destination address and the request priority may be added into a co-processing request message in a form of fields separately, and the fields together form one co-processing request message.

S102: According to the address information which is of the to-be-processed data and carried in the co-processing request message, obtain the to-be-processed data, and store the to-be-processed data in a public buffer card.

It should be noted that, the public buffer card provides a temporary buffer for data transmission between each compute node and each co-processor card in the computer system.

Specifically, in an embodiment, according to the address information carried in the co-processing request message, the to-be-processed data may be obtained from a hard disk of the computer system.

In an embodiment, the address information in the co-processing request message includes: a source address and a length of to-be-processed data. Specifically, the to-be-processed data is obtained according to information of two fields which are the source address and the length of the to-be-processed data and are in the co-processing request message. The to-be-processed data specifically refers to original data which is stored in the hard disk of the computer system and waits to be processed by the co-processor card. The source address field in the co-processing request message indicates a starting address of the to-be-processed data in the hard disk of the computer system, and therefore, in the hard disk of the computer system, data in a contiguous address space which starts from the source address and has a size being the length of the to-be-processed data is the to-be-processed data. The to-be-processed data is stored in the public buffer card.

In an embodiment, a copying or migration manner may be adopted for storing the to-be-processed data in the public buffer card.

Specifically, a copying or migration operation may be performed in a DMA manner. Specifically, before data copying or migration is performed, an I/O interface of a storage device where the to-be-processed data is located first sends a DMA request instruction, to make a bus request to a bus logic controller of the computer system. When the compute node in the computer system completes execution of an instruction in a current bus cycle and releases a bus control right, the bus logic controller outputs a bus reply, which indicates that the DMA has already responded, and gives the bus control right to a DMA controller. After obtaining the bus control right, the DMA controller notifies the I/O interface of starting DMA transmission, where the I/O interface is the I/O interface of the storage device where the to-be-copied data is located; and outputs a read/write command, to directly control data transmission. The whole data transmission process does not need involvement of the compute node in the computer system, which effectively saves sources in the system.

It should be noted that, the hard disk may specifically include a magnetic disk type hard disk and a solid state type hard disk (such as a flash SSD and a PCMSSD).

It should be noted that, the public buffer card is added in the computer system, and as public temporary storage for each compute node and each co-processor card to perform data transmission, it is different from a buffer of a co-processor card, such as a buffer of a GPU acceleration card. The public buffer card is a buffer area shared by all co-processor cards in the computer system, and is used as a buffer channel for the hard disk and all co-processor cards of the computer system to transmit data. The public buffer card may be any storage medium having a fast accessing capability. In an embodiment, the public buffer card may be a PCIE public buffer card, and its storage medium is a Flash SSD (Solid State Storage, solid state drive), a PCM SSD, a DRAM (dynamic random access memory) or the like.

S103: Allocate the to-be-processed data stored in the public buffer card to an idle co-processor card in the computer system for processing.

It should be noted that, the idle co-processor card may be a co-processor card currently having no co-processing task; and may also be a co-processor card which is selected according to a load balancing policy and has a lighter load or is relatively idle. For example, a co-processor card currently having a lowest CPU utilization rate may be used as an idle co-processor card.

Specifically, in an embodiment, according to a request type in a co-processing request message and a utilization rate of each co-processor card matching the request type, it is judged whether there is an idle co-processor card matching the request type in the co-processing request message. If there is a matching idle co-processor card, the to-be-processed data in the public buffer card is allocated to the idle processor for processing. For example, in an embodiment, if a certain compute node requests for a graphics co-processing service, CPU utilization rates of all GPU acceleration cards in a current computer system are obtained through a system function call. If a CPU utilization rate of a certain GPU acceleration card is less than 5%, it may be judged that the GPU acceleration card is in an idle state, and then the to-be-processed data is copied or migrated from the public buffer card to a storage device of the GPU acceleration card for processing. Definitely, it can be understood that, in another embodiment, if a certain compute node requests for another type of co-processing service, such as a floating-point operation type, it should be judged whether there is any floating-point operation co-processor card being idle, which is not described in detail again herein.

Further, in order to sort multiple co-processing requests according to priority, to make a co-processing request of high priority be processed first, and to make the co-processor card be utilized more reasonably, in another embodiment, S103 may specifically include the following steps:

(1): Obtain request priority and a request type of each co-processing request message from each co-processing request message.

(2): According to the request priority and request type of each co-processing request message, determine processing order of each co-processing request message.

Specifically, a method for determining the processing order of each co-processing request message is that: Co-processing request messages of different request types are placed in different message queues. Co-processing request messages of a same request type queue in a corresponding message queue, in descending order and according to request priority. Co-processing request messages of same request priority and a same request type queue in a corresponding message queue and in order of requests. An idle co-processor card matching a request type processes to-be-processed data in order of a corresponding task queue.

(3): Allocate, in sequence and according to the processing order, to-be-processed data from the public buffer card to an idle co-processor card in the computer system for processing, where the to-be-processed data corresponds to each co-processing request message.

It should be noted that, a specific method for allocating the to-be-processed data from the public buffer card to the idle co-processor card for processing has already been illustrated above in detail, which is not described in detail again herein.

In Embodiment 1 of the present invention, through the foregoing technical solution, according to a co-processing request message sent by each compute node in the computer system, to-be-processed data on which processing is requested by each compute node is allocated to the idle co-processor card in the system for processing. The compute node does not need to consume its own resources to perform allocation of the to-be-processed data, which reduces resource overheads of each compute node itself. The public buffer card is used as a public data buffer channel between each compute node and each co-processor card of the computer system, and the to-be-processed data does not need to be transferred by the memory of the compute node, which avoids overheads of the to-be-processed data in transmission through the memory of the compute node, breaks through a bottleneck of memory delay and bandwidth, and increases a co-processing speed of the to-be-processed data.

Figure 3:
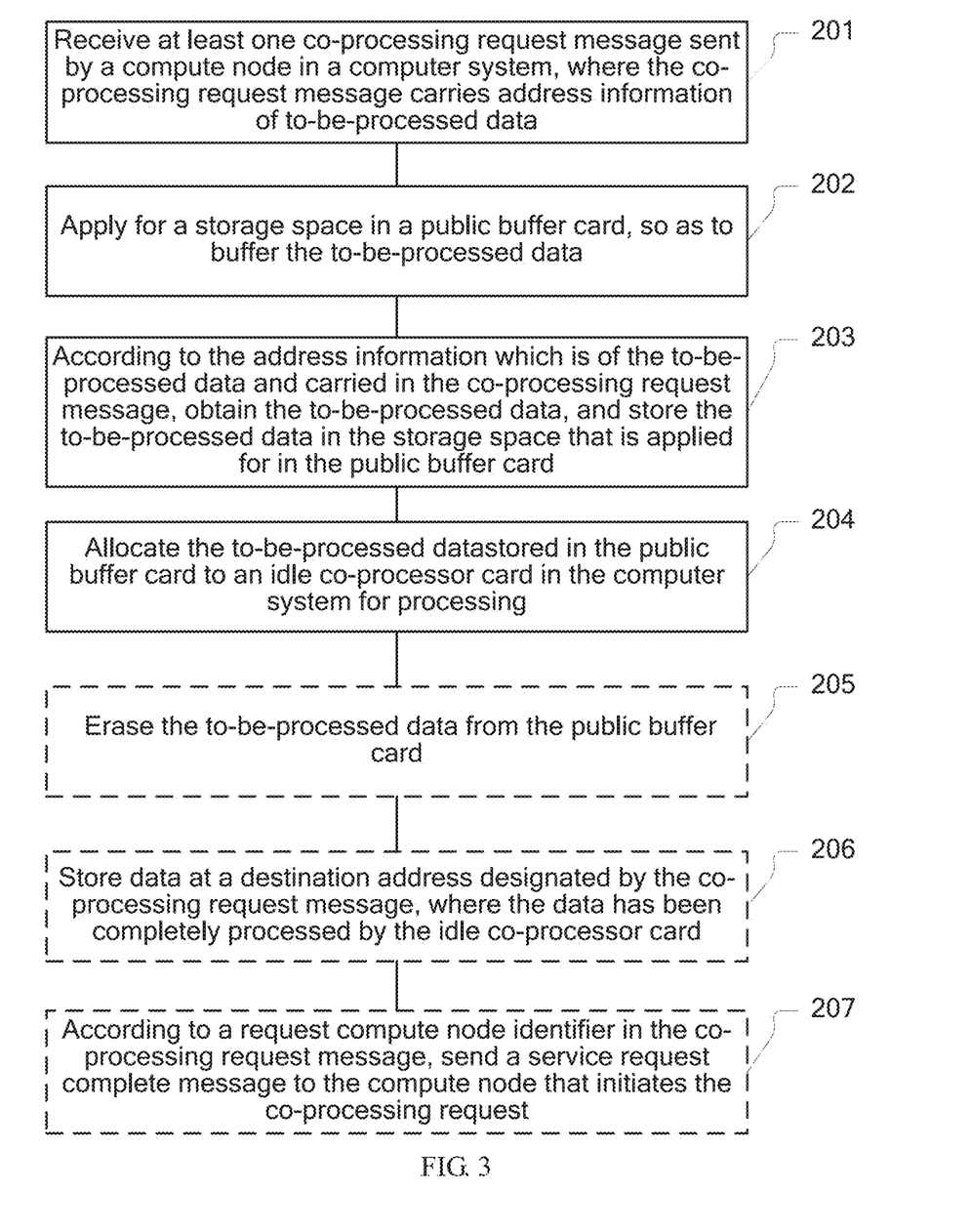
FIG. 3 is a flow chart of a co-processing acceleration method according to Embodiment 2 of the present invention.

Embodiment 2: An embodiment of the present invention provides a co-processing acceleration method, which is used to increase a speed of co-processing in a computer system. As shown in FIG. 3, the method includes:

S201: Receive at least one co-processing request message sent by a compute node in a computer system.

In an embodiment, each co-processing message carries address information of to-be-processed data (that is, to-be-processed data on which processing is requested by the by the compute node through the co-processing message) corresponding to the co-processing message.

Specifically, in the computer system, at least one compute node and at least one co-processor card exist. The co-processor card may aid the compute node in task processing, that is, co-processing. When the compute node needs aid of the co-processor card in task processing, the compute node sends a co-processing request message. In an embodiment, the co-processing request message may be a data packet including several fields.

In an embodiment, the co-processing request message specifically includes, but is not limited to, the following information:

1. Request compute node identifier;

In a computer system, at least one compute node exists, and a request compute node identifier is used to identify and distinguish a compute node which initiates a service request. Specifically, each compute node in the computer system may be allocated a unique ID number, and when a certain compute node sends a co-processing request message, an ID number of the compute node is used as a request compute node identifier.

2. Request type;

A request type is used to indicate a co-processing type requested by a compute node. Common co-processing types include: a graphics processing type, a floating-point operation type, a network type, and a Hash operation type. Specifically, a field in a co-processing request message may be used to indicate the request type. For example, a request type field being graphic indicates the graphics processing type, a request type field being float indicates the floating-point operation type, a request type field being net indicates the network type, and a request type field being Hash indicates the Hash operation type. It should be noted that, in the computer system one or more types of co-processor card may be configured, and therefore, an allowable request type needs to be determined according to the type of a co-processor card configured in the current computer system. For example, in an embodiment, only one type of co-processor card such as a GPU acceleration card may be configured in a system, and in this case, the request type includes only the graphics processing type; in another embodiment, multiple types of co-processor card, such as a floating-point operation co-processor card, a Hash operation co-processor card, a network co-processor card, and a GPU acceleration card, may be configured in a system at the same time, and in this case, the request type correspondingly includes the floating-point operation type, the Hash operation type, the network type, the graphics processing type and so on, which is not specifically limited in the embodiments of the present invention.

3. Address information of to-be-processed data

In an embodiment, address information of to-be-processed data may include a source address and a length of the to-be-processed data.

The source address indicates a starting address of a storage space where data waiting to be processed by a co-processor card (that is, to-be-processed data) is located. In an embodiment, the source address may be a certain address in a nonvolatile storage device of a computer system. Further, the non-volatile storage device may be a hard disk or a flash (a flash memory). It should be noted that, the hard disk may specifically include a magnetic disk type hard disk and a solid state type hard disk (such as a flash SSD and a PCMSSD).

The length of the to-be-processed data indicates the size of a storage space required by the to-be-processed data.

4. Destination address

A destination address is a final storage address of data which has been completely processed by a co-processor card. In an embodiment, the destination address may be a certain address in a hard disk of a computer system, for example, a certain address in a hard disk. It should be noted that, the hard disk may specifically include a magnetic disk type hard disk and a solid state type hard disk (such as a flash SSD and a PCMSSD).

5. Request priority

Request priority is designated by a compute node according to the nature, degree of urgency or origin of a co-processing task. In an embodiment, the request priority may be divided into three levels, high, medium, and low. Definitely, it can be understood that in another embodiment, the priority may further be divided into more levels, such as extremely high, high, ordinary, normal, low, extremely low, and may also be priority levels represented by Arabic numbers 1, 2, 3 and so on, which is not specifically limited in this embodiment.

In an embodiment, information such as the request compute node identifier, the request type, the source address, the length of the to-be-processed data, the destination address and the request priority may be added into a co-processing request message in a form of fields separately, and the fields together form one co-processing request message.

Step S202: Apply for a storage space in a public buffer card, so as to buffer to-be-processed data, where the public buffer card is disposed in the computer system, and provides temporary storage for data transmission between each compute node and each co-processor card in the computer system.

Specifically, according to a field of a length of the to-be-processed data in address information which is of the to-be-processed data and carried in the co-processing request message, the public buffer card is applied to for a memory space of a size corresponding to the length of the to-be-processed data, where the memory space is used to buffer the to-be-processed data.

S203: According to the address information which is of the to-be-processed data and carried in the co-processing request message, obtain the to-be-processed data, and store the to-be-processed data in the storage space which is applied for in the public buffer card.

Specifically, in an embodiment, according to the address information carried in the co-processing request message, the to-be-processed data may be obtained from a hard disk of the computer system.

In an embodiment, the address information in the co-processing request message includes: a source address and a length of to-be-processed data. Specifically, the to-be-processed data is obtained according to information of two fields which are the source address and the length of the to-be-processed data and are in the co-processing request message. The to-be-processed data specifically refers to original data which is stored in the hard disk of the computer system and waits to be processed by the co-processor card. The source address field in the co-processing request message indicates a starting address of the to-be-processed data in the hard disk of the computer system, and therefore, in the hard disk of the computer system, data in a contiguous address space which starts from the source address and has a size being the length of the to-be-processed data is the to-be-processed data. It should be noted that, the hard disk may specifically include a magnetic disk type hard disk and a solid state type hard disk (such as a flash SSD and a PCMSSD).

In an embodiment, a copying or migration manner may be adopted for storing the to-be-processed data in the public buffer card.

S204: Allocate the to-be-processed data stored in the public buffer card to an idle co-processor card in the computer system for processing.

It should be noted that, the idle co-processor card may be a co-processor card currently having no co-processing task; and may also be a co-processor card which is selected according to a load balancing policy and has a lighter load and is relatively idle. For example, a co-processor card currently having a lowest CPU utilization rate may be used as an idle co-processor card.

Specifically, in an embodiment, according to a request type in a co-processing request message and a utilization rate of each co-processor card matching the request type, it is judged whether there is an idle co-processor card matching the request type in the co-processing request message. If there is a matching idle co-processor card, the to-be-processed data in the public buffer card is allocated to the idle processor for processing. For example, in an embodiment, if a certain compute node requests for a graphics co-processing service, CPU utilization rates of all GPU acceleration cards in a current computer system are obtained through a system function call. If a CPU utilization rate of a certain GPU acceleration card is less than 5%, it may be judged that the GPU acceleration card is in an idle state, and then the to-be-processed data is copied or migrated from the public buffer card to a storage device of the GPU acceleration card for processing. Definitely, it can be understood that in another embodiment, if a certain compute node requests for another type of co-processing service, such as a floating-point operation type, it should be judged whether there is any floating-point operation co-processor card being idle, which is not described in detail again herein.

Further, in order to sort multiple co-processing requests according to priority, to make a co-processing request of high priority be processed first, and to make the co-processor card be utilized more reasonably, in another embodiment, S204 may specifically include the following steps.

(1): Obtain request priority and a request type of each co-processing request message from each co-processing request message.

(2): According to the request priority and request type of each co-processing request message, determine processing order of each co-processing request message.

Specifically, a method for determining the processing order of each co-processing request message is that: Co-processing request messages of different request types are placed in different message queues. Co-processing request messages of a same request type queue in a corresponding message queue, in descending order and according to request priority. Co-processing request messages of same request priority and a same request type queue in a corresponding message queue and in order of requests. An idle co-processor card matching a request type processes to-be-processed data in order of a corresponding task queue.

(3): Allocate, in sequence and according to the processing order, to-be-processed data from the public buffer card to an idle co-processor card in the computer system for processing, where the to-be-processed data corresponds to each co-processing request message.

Further, after the to-be-processed data is allocated from the public buffer card to the idle co-processor card in the computer system for processing, the co-processing acceleration method provided by Embodiment 2 of the present invention further includes:

S205: Erase the to-be-processed data from the public buffer card.

S206: Store data at a destination address designated by the co-processing request message, where the data has been completely processed by the idle co-processor card.

It should be noted that, the destination address is the destination address carried in the co-processing request message, and it indicates a final storage address of the data which has been completely processed by the co-processor card.

Further, after the data which has been completely processed by the idle co-processor card is stored at the destination address designated by the co-processing request message, the co-processing acceleration method provided by Embodiment 2 of the present invention further includes:

S207: According to the request compute node identifier in the co-processing request message, send a service request complete message to the compute node which initiates the co-processing request.

In an embodiment, the service request complete message may be a data packet which includes a field having a specific meaning. The specific field included by the packet may be "finish", "ok" or "yes", and is used to indicate that a current co-processing task has already been completed.

In Embodiment 2 of the present invention, through the foregoing technical solution, according to a co-processing request message sent by each compute node in the computer system, to-be-processed data on which processing is requested by each compute node is allocated to the idle co-processor card in the system for processing. The compute node does not need to consume its own resources to perform allocation of the to-be-processed data, which reduces resource overheads of each compute node itself. The public buffer card is used as a public data buffer channel between each compute node and each co-processor card of the computer system, and the to-be-processed data does not need to be transferred by the memory of the compute node, which avoids overheads of the to-be-processed data in transmission through the memory of the compute node, breaks through a bottleneck of memory delay and bandwidth, and increases a co-processing speed of the to-be-processed data.

Figure 4:
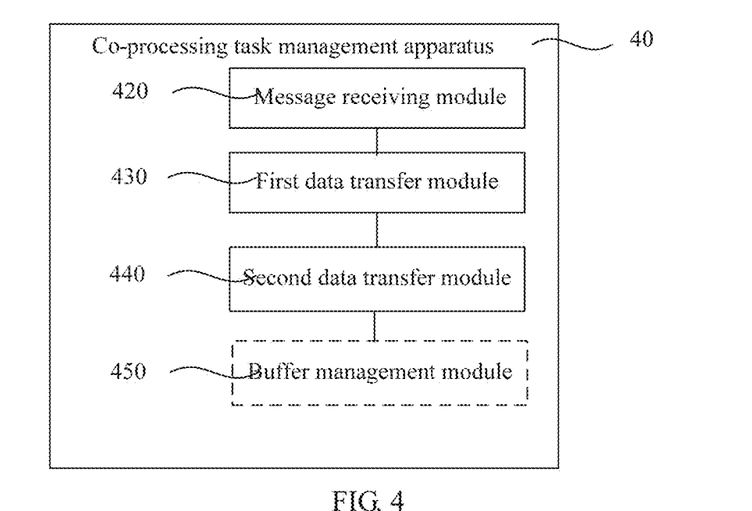
FIG. 4 is a schematic diagram of a co-processing task management apparatus according to Embodiment 3 of the present invention.

Embodiment 3: The embodiment of the present invention provides a co-processing task management apparatus, configured to manage co-processing tasks in a computer system in a unified manner. As shown in FIG. 4, the co-processing task management apparatus includes:

A message receiving module 420 is configured to receive at least one co-processing request message sent by a compute node in the computer system, where the co-processing request message carries address information of to-be-processed data.

Specifically, in the computer system, if the compute node needs a co-processor card to process the to-be-processed data, the compute node sends a co-processing request message to the message receiving module 420. The message receiving module 420 receives the co-processing request message sent by the compute node. Content included in the co-processing request message are exactly the same as content of the co-processing request message described in S101 of Embodiment 1 of the present invention, and is not described in detail again in this embodiment.

In another embodiment, the message receiving module 420 is further configured to, after the co-processor card has completely processed the data, send, according to a request compute node identifier in the co-processing request message, a service request complete message to the compute node which initiates the co-processing request.

Specifically, after the co-processor card has completely processed the data, the message receiving module 420 sends, according to the request compute node identifier in the co-processing request message, the service request complete message to the compute node which initiates the co-processing request. In an embodiment, the service request complete message may be a data packet which includes a field having a specific meaning. The specific field included by the packet may be "finish", "OK" or "yes", and is used to indicate that a current co-processing task has already been completed.

A first data transfer module 430 is configured to, according to the address information which is of the to-be-processed data and carried in the co-processing request message, obtain the to-be-processed data, and store the to-be-processed data in a public buffer card.

Specifically, in an embodiment, the first data transfer module 430 may, according to the address information carried in the co-processing request message, obtain the to-be-processed data from a hard disk of the computer system. In an embodiment, the address information in the co-processing request message includes: a source address and a length of to-be-processed data. Specifically, the first data transfer module 430 obtains the to-be-processed data according to information of two fields which is the source address and the length of the to-be-processed data and is in the co-processing request message. The to-be-processed data specifically refers to original data which is stored in the hard disk of the computer system and waits to be processed by the co-processor card. The source address field in the co-processing request message indicates a starting address of the to-be-processed data in the hard disk of the computer system, and therefore, in the hard disk of the computer system, data in a contiguous address space which starts from the source address and has a size being the length of the to-be-processed data is the to-be-processed data.

It should be noted that, the hard disk may specifically include a magnetic disk type hard disk and a solid state type hard disk (such as a flash SSD and a PCMSSD).

It should be noted that, the public buffer card is added in the computer system, and as temporary storage for each compute node and each co-processor card to perform data transmission, it is different from a buffer of a co-processor card, such as a buffer of a GPU acceleration card. The public buffer card is a buffer area shared by all co-processor cards in the computer system, and is used as a buffer channel for the hard disk and all co-processor cards of the computer system to transmit data. The public buffer card may be any storage medium having fast accessing capability. In an embodiment, the public buffer card may be a PCIE public buffer card, and its storage medium may be a Flash SSD, a PCM SSD, a DRAM or the like.

A second data transfer module 440 is configured to allocate the to-be-processed data stored in the public buffer card to an idle co-processor card in the computer system for processing.

It should be noted that, the idle co-processor card may be a co-processor card currently having no co-processing task; and may also be a co-processor card which is selected according to a load balancing policy and has a lighter load and is relatively idle. For example, a co-processor card currently having a lowest CPU utilization rate may be used as an idle co-processor card.

Specifically, in an embodiment, according to a request type in a co-processing request message and a utilization rate of each co-processor card matching the request type, the second data transfer module 440 judges whether there is an idle co-processor card matching the request type in the co-processing request message. If there is a matching idle co-processor card, the second data transfer module 440 allocates the to-be-processed data in the public buffer card to the idle processor for processing. For example, in an embodiment, if a certain compute node requests for a graphics co-processing service, the second data transfer module 440 obtains, through a system function call, CPU utilization rates of all GPU acceleration cards in a current computer system; and if a CPU utilization rate of a certain GPU acceleration card is less than 5%, may judge that the GPU acceleration card is in an idle state, and then copy or migrate the to-be-processed data from the public buffer card to a storage device of the GPU acceleration card for processing. Definitely, it can be understood that in another embodiment, if a certain compute node requests for another type of co-processing service, such as a floating-point operation type, it should be judged whether there is any floating-point operation co-processor card being idle, which is not described in detail again herein.

Further, in another embodiment, the second data transfer module 440 may further be configured to store data at a destination address designated by the co-processing request message, where the data has been completely processed by the co-processor card.

Figure 5:
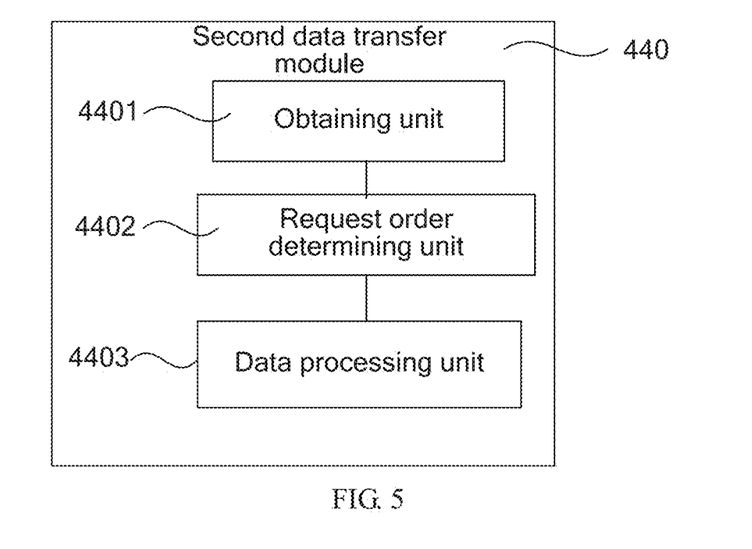
FIG. 5 is a schematic diagram of a second data transfer module according to Embodiment 3 of the present invention.

In an embodiment, as shown in FIG. 5, when there are multiple co-processing request messages, in order to sort multiple co-processing requests according to priority, to make a co-processing request of high priority be processed first, and to make the co-processor card be utilized more reasonably, the second data transfer module may specifically include:

An obtaining unit 4401 is configured to obtain request priority and a request type of each co-processing request message from each co-processing request message.

A request order determining unit 4402 is configured to determine processing order of each co-processing request message according to the request priority and request type of each co-processing request message.

In an embodiment, a method for the request order determining unit 4402 to determine the processing order of each co-processing request message is that: Co-processing request messages of different request types are placed in different message queues. Co-processing request messages of a same request type queue in a corresponding message queue, in descending order and according to request priority. Co-processing request messages of a same request priority and a same request type queue in the corresponding message queue in order of requests. An idle co-processor card matching a request type processes to-be-processed data in order of a corresponding task queue.

A data processing unit 4403 is configured to allocate, in sequence and according to the processing order, to-be-processed data from the public buffer card to an idle co-processor card in the computer system for processing, where the to-be-processed data corresponds to each co-processing request message.

In an embodiment, the first data transfer module 430 may adopt a copying or migration manner to store the to-be-processed data in the public buffer card; the second data transfer module 440 may adopt the copying or migration manner to store data at the destination address designated by the co-processing request message, where the data has been completely processed by the co-processor card. Further, the first data transfer module 430 and the second data transfer module 440 may implement copying or migration of data between a hard disk of the compute node, the public buffer card, and the co-processor card in a DMA manner. Specifically, taking the first data transfer module 430 as an example, before data copying or migration is performed, an I/O interface of a storage device where the to-be-processed data is located first sends a DMA request instruction to the first data transfer module 430; the first data transfer module 430, according to the DMA request instruction, makes a bus request to a bus logic controller of the computer system. When the compute node in the computer system completes execution of an instruction in a current bus cycle and releases a bus control right, the bus logic controller outputs a bus reply, which indicates that the DMA has already responded, and gives the bus control right to the first data transfer module 430. After obtaining the bus control rights, the first data transfer module 430 notifies the I/O interface of starting DMA transmission, where the I/O interface is the I/O interface of the storage device where the to-be-copied data is located; and outputs a read/write command, to directly control data transmission. The whole data transmission process does not need involvement of the compute node in the computer system, which effectively saves sources in the system.

For specific work of the second data transfer module 440, reference may be made to S103 in Embodiment 1 of the present invention.

Further, in order to facilitate management of a storage space of the public buffer card, the co-processing task management apparatus provided by Embodiment 3 of the present invention further includes:

a buffer management module 450, configured to, before the first data transfer module 430 stores the to-be-processed data in the public buffer card, apply for a storage space in the public buffer card, where the storage space is used to buffer the to-be-processed data.

In Embodiment 3 of the present invention, through the foregoing technical solution, the co-processing task management apparatus manages the co-processing task of each compute node in the computer system in a unified manner through the co-processing request message. The compute node does not need to consume its own resources to perform allocation of the to-be-processed data, which reduces resource overheads of each compute node itself. Meanwhile, the added public buffer card is used as a public data buffer channel between the hard disk and each co-processor card of the computer system, which implements copying or migration of the data, avoids overheads of the to-be-processed data in transmission through the memory of the compute node, and thereby breaks through a bottleneck of memory delay and bandwidth, and increases a co-processing speed of the to-be-processed data. Further, before the data is copied to the public buffer card, the buffer management module is used to apply for a space in the public buffer card, which makes management of the space of the public buffer card more convenient. Further, the task priority management module makes the co-processing request of high priority be processed first, and makes the co-processor card be utilized more reasonably, which improves efficiency of co-processing.

Figure 6:
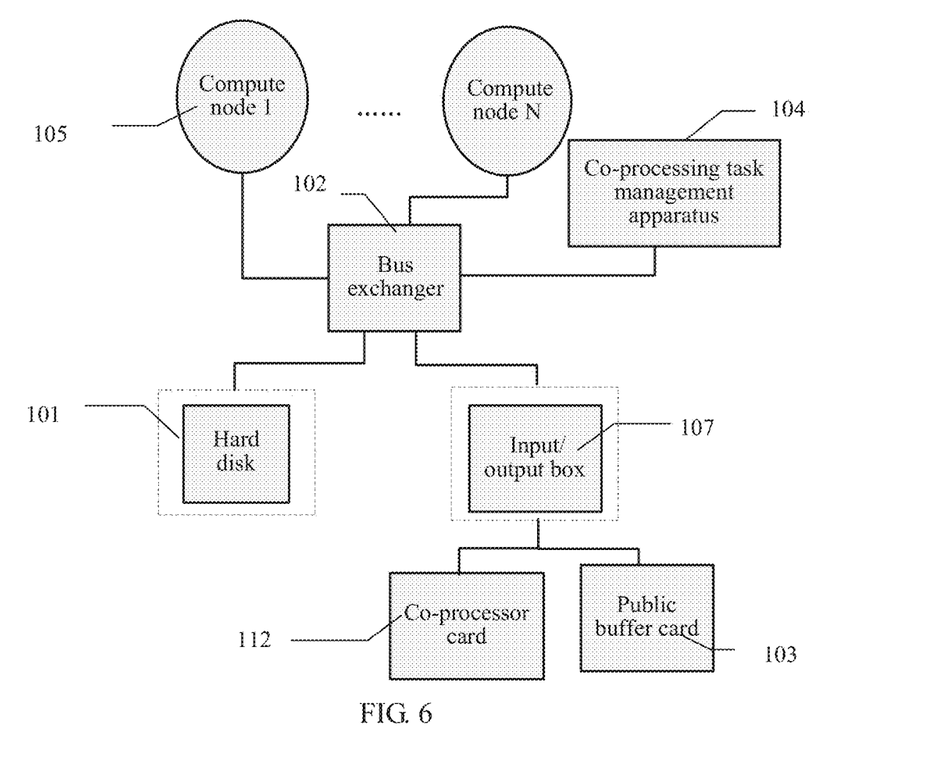
FIG. 6 is a structural diagram of a computer system according to Embodiment 4 of the present invention.

Embodiment 4: As shown in FIG. 6, Embodiment 4 of the present invention provides a computer system, including:

a hard disk 101, a bus exchanger 102, a public buffer card 103, a co-processing task management apparatus 104, at least one compute node (for example, a compute node 105 in FIG. 6), and at least one co-processor card (for example, a co-processor card 112 in FIG. 6); where the co-processor card 112, the hard disk 101, and the public buffer card 103 are coupled in data connection to the bus exchanger 102, the bus exchanger 102 makes the co-processor card 112, the hard disk 101, and the public buffer card 103 be interconnected; the at least one compute node 105 is configured to send a co-processing request message, the co-processing request message carries address information of to-be-processed data, and the to-be-processed data is data on which processing is requested by the compute node 105.

The co-processing task management apparatus 104 is configured to: receive the co-processing request message; according to the address information which is of the to-be-processed data and carried in the co-processing request message, obtain the to-be-processed data, and store the to-be-processed data in the public buffer card 103, where the to-be-processed data is data on which processing is requested by the co-processing request message; and allocate the to-be-processed data stored in the public buffer card 103 to an idle co-processor card among the at least one co-processor card in the computer system (it is assumed that the co-processor card 112 in FIG. 6 is idle) for processing.

In an embodiment, the computer system further includes a hard disk 101, and the co-processing task management apparatus 104, according to the co-processing request message, obtains the to-be-processed data from the hard disk 101. It should be noted that, the hard disk 101 may specifically be a magnetic disk type hard disk or a solid state type hard disk (such as a flash SSD and a PCMSSD).

Further, in order to facilitate management of a storage space of a buffer card, in an embodiment, the co-processing task management apparatus 104 is further configured to, before the to-be-processed data is stored in the public buffer card 103, apply for a storage space in the public buffer card 103, where the storage space is used to store the to-be-processed data. In another embodiment, the co-processing task management apparatus 104 is further configured to erase the to-be-processed data from the public buffer card 103 after the to-be-processed data in the public buffer card 103 is allocated to the co-processor card 112 for processing.

In another embodiment, the co-processing task management apparatus 104 is further configured to store data at a destination address designated by the co-processing request message, where the data has been completely processed by the co-processor card 112. Correspondingly, the at least one compute node 105 is configured to obtain the data from the destination address, where the data has been completely processed by the co-processor card 112.

In an embodiment, the co-processing task management apparatus 104 may adopt a copying or migration manner to store the to-be-processed data in the public buffer card 103, and may also adopt a copying or migration manner to store the data at the destination address designated by the co-processing request message, where the data has been completely processed by the co-processor card 112. Further, a copying or migration operation may be implemented in a DMA manner.

In an embodiment, the public buffer card 103 may be a PCIE buffer card, and its storage medium may be a Flash SSD, a PCM SSD, or a DRAM.

In an embodiment, the co-processor card 112, the hard disk 101, and the public buffer card 103 may all be directly connected to the bus exchanger 102 through a PCIE bus.

In another embodiment, as shown in FIG. 6, the co-processor card 112 and the public buffer card 103 are connected to the bus exchanger 102 through an input/output subrack. Specifically, the co-processor card 112 and the public buffer card 103 are inserted into PCIE slots of an input/output box 107, and the input/output box 107 is connected to the bus exchanger 102 through the PCIE bus.

As the latest bus interface standard and compared with other bus interface standards, PCIE has a higher data transmission rate, and therefore, use of a PCIE bus for data connection may increase the speed at which data is transmitted between the hard disk, the co-processor card, and the public buffer card, and further increases a co-processing speed of the computer system.

Definitely, it can be understood that in another embodiment in actual applications, the co-processor card 112, the hard disk 101, and the public buffer card 103 may also be connected to the bus exchanger 102 through an AGP bus, which is not specifically limited in the embodiment of the present invention.

It should be noted that, that the computer system provided by Embodiment 4 of the present invention includes one co-processor card 112 and one compute node 105 is only an example, and therefore shall not be construed as a limit to the quantities of compute nodes and co-processor cards of the computer system provided by Embodiment 4 of the present invention. It can be understood that, in an embodiment, the quantities of compute nodes and co-processor cards may be any integer values greater than 0, but in actual applications, on account of cost saving, the quantity of co-processor cards shall not be greater than the quantity of compute nodes in the computer system. For example, a current co-processing apparatus includes 20 compute nodes, and therefore the quantity of co-processor cards may be 1, 5, 10, 15, 20, or the like.

Further, in an embodiment, there may be only one type of co-processor card, for example, a GPU acceleration card; and there may also be multiple types, for example, a floating-point operation co-processor card, a Hash operation co-processor card, a network co-processor card, the GPU acceleration card, and so on. Definitely, it can be understood that, the more types of co-processor cards the computer system includes, the more types of co-processing tasks the whole system can support, and the more powerful a co-processing function is.

In Embodiment 4 of the present invention, through the foregoing technical solution, the co-processing task management apparatus manages co-processing tasks in the computer system in a unified manner, which reduces resource overheads of each compute node. Meanwhile, the multiple co-processor cards in the computer system may share the public buffer card, which is used as a data buffer channel between the hard disk and the co-processor cards, and the co-processing task management apparatus is used to implement copying or migration of the data, which avoids overheads of the data in transmission through the memory of the compute node, and thereby breaks through a bottleneck of memory delay and bandwidth, and increases the co-processing speed. Further, the PCIE bus is used to connect the co-processor card, the hard disk, the public buffer card, and the bus exchanger in the computer system, so as to effectively increase the transmission rate of the data, and further increases the co-processing speed.

Figure 7:
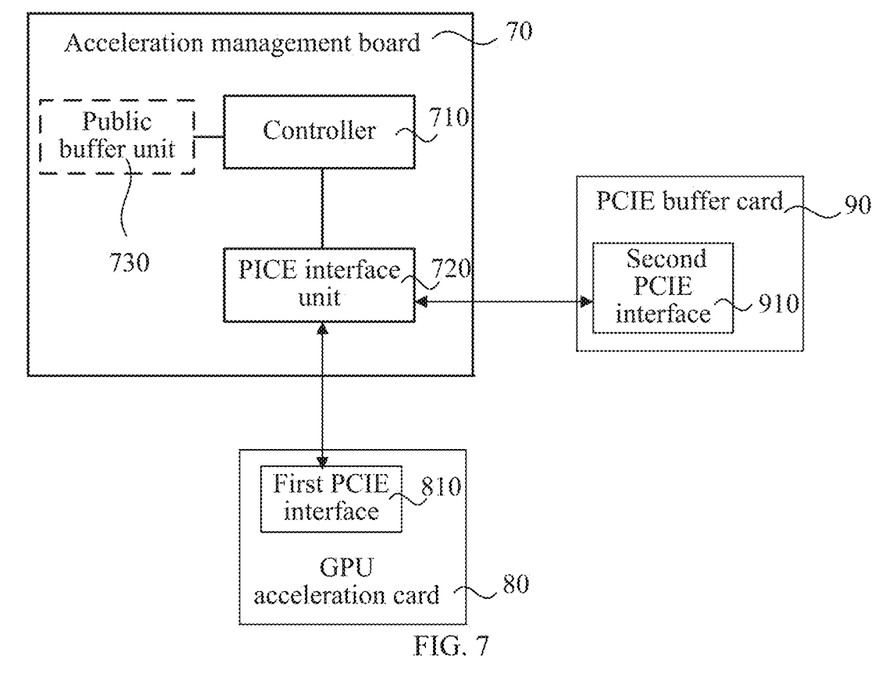
FIG. 7 is a schematic diagram of an acceleration management board according to Embodiment 5 of the present invention.

Embodiment 5: As shown in FIG. 7, Embodiment 5 of the present invention provides an acceleration management board, which is configured to increase a co-processing speed of a computer system, and includes a controller 710 and a PCIE interface unit 720. The controller 710 and the PCIE interface unit 720 are coupled in data connection. The controller 710 receives at least one co-processing request message sent by a CPU of a compute node in the computer system, where the co-processing request message carries address information of to-be-processed data; and according to the address information of the to-be-processed data, obtains the to-be-processed data from a hard disk in the computer system; and stores the to-be-processed data in a public buffer unit, where the to-be-processed data is data on which processing is requested by the CPU.

The controller 710 is further configured to allocate the to-be-processed data stored in the public buffer unit to an idle GPU acceleration card in the computer system for processing. Specifically, as shown in FIG. 7, a GPU acceleration card 80 are coupled in data connection, through its own first PCIE interface 810, to the PICE interface unit 720 of the acceleration management board 70.

In an embodiment, the public buffer unit may also be integrated inside the acceleration management board. As shown in FIG. 7, a public buffer unit 730 is connected to the controller 710 through a bus on the acceleration management board 70. Specifically, the bus on the acceleration board may be a PCIE bus.

In another embodiment, the public buffer unit may also be disposed outside the acceleration management board, and is used as an independent physical entity. Further, the public buffer unit may be a PCIE buffer card. Specifically, as shown in FIG. 7, a PCIE buffer card 90 includes a second PCIE interface 910, and the PCIE buffer card 90 is connected, through its own second PCIE interface 910, to the PCIE interface unit 720 of the acceleration management board 70.

It should be noted that, as the latest bus interface standard and compared with other bus interface standards, PCIE has a higher data transmission rate, and therefore, in the embodiment, use of a PCIE interface as an interface for data connection between the GPU acceleration card and the controller and between the controller and the public buffer unit is only an example for achieving an optimal technical effect, so shall not be construed as a limit to the embodiment of the present invention.

In the embodiment of the present invention, through the foregoing technical solution, an independent controller manages co-processing tasks in the computer system in a unified manner, which reduces resource overheads of each compute node. Meanwhile, multiple co-processor cards in the computer system may share the public buffer card which is used as a data buffer channel between the hard disk and the co-processor cards, which avoids overheads of the data in transmission through the memory of the compute node, and thereby breaks through a bottleneck of memory delay and bandwidth, and increases a co-processing speed.

What are described above are merely several embodiments of the present invention. Persons skilled in the prior art can make various modifications or variations according to the disclosure of the application document, without departing from the spirit and principle of the present invention.

What is claimed is:

1. A computer system, comprising:
   at least one compute node;
   a bus exchanger;
   at least one co-processor card;
   a public buffer card; and
   a co-processing task management apparatus, wherein
   the public buffer card provides temporary storage for data transmission between each compute node of the at least one compute node and each co-processor card of the at least one co-processor card,
   the public buffer card and the at least one co-processor card are interconnected through the bus exchanger,
   each respective compute node of the at least one compute node is configured to send a co-processing request message that carries address information of to-be-processed data, and the to-be-processed data is data on which processing is requested by the respective compute node, and
   the co-processing task management apparatus is configured to, for each respective compute node of the at least one compute node:
      receive the co-processing request message sent by the respective compute node,
      according to the address information which is of the to-be-processed data and carried in the co-processing request message sent by the respective compute node, obtain the to-be-processed data, and store the to-be-processed data in the public buffer card, and
      allocate the to-be-processed data stored in the public buffer card to an idle co-processor card of the at least one co-processor card for processing.

2. The computer system according to claim 1, wherein the co-processing task management apparatus is further configured to, before the to-be-processed data is stored in the public buffer card, apply for a storage space in the public buffer card, wherein the storage space is used to store the to-be-processed data.

3. The computer system according to claim 2, wherein the co-processing task management apparatus is further configured to store data at a destination address designated by the co-processing request message sent by the respective compute node, wherein the data has been completely processed by the idle co-processor card.

4. The computer system according to claim 3, wherein each respective compute node of the at least one compute node is further configured to obtain the data from the destination address designated by the co-processing request message sent by the respective compute node, wherein the data has been completely processed by the idle co-processor card.

5. The computer system according to claim 4, wherein the co-processing task management apparatus is further configured to, after the to-be-processed data stored in the public buffer card is allocated to the idle co-processor card for processing, erase the to-be-processed data from the public buffer card.

6. The computer system according to claim 5, wherein the co-processing task management apparatus is specifically configured to:
   receive multiple co-processing request messages;
   according to each co-processing request message, obtain corresponding to-be-processed data, and store each piece of to-be-processed data in the public buffer card;
   obtain request priority and a request type of each co-processing request message from each co-processing request message;
   according to the request priority and request type of each co-processing request message, determine processing order of the to-be-processed data corresponding to each co-processing request message; and
   allocate, in sequence and according to the processing order, each piece of to-be-processed data from the public buffer card to the idle co-processor card for processing.

7. The computer system according to claim 6, wherein:
   the public buffer card is a Peripheral Component Interconnect Express PCIE buffer card, and
   the public buffer card includes storage medium that is a flash solid state drive flash SSD, a phase change memory solid state drive PCM SSD, or a dynamic random access memory DRAM.

8. The computer system according to claim 7, wherein each co-processor card of the at least one co-processor card is a PCIE co-processor card.

9. The computer system according to claim 8, wherein the PCIE co-processor card is a graphics processing unit GPU acceleration card.

10. The computer system according to claim 9, wherein the public buffer card and the at least one co-processor card are connected to the bus exchanger through a PCIE interface.

11. The computer system according to claim 10, wherein the co-processing task management apparatus, according to the co-processing request message, obtains the to-be-processed data from a hard disk in the computer system.

12. The computer system according to claim 10, wherein the co-processing task management apparatus adopts a direct memory access DMA manner to store the to-be-processed data in the public buffer card.

13. A co-processing acceleration method, comprising:
receiving a co-processing request message sent by a compute node in a computer system, wherein the co-processing request message carries address information of to-be-processed data, and the to-be-processed data is data on which processing is requested by the compute node;
according to the address information which is of the to-be-processed data and carried in the co-processing request message, obtaining the to-be-processed data, and storing the to-be-processed data in a public buffer card, wherein the to-be-processed data is data on which processing is requested by the co-processing request message; and
allocating the to-be-processed data stored in the public buffer card to an idle co-processor card in the computer system for processing.

14. The method according to claim 13, wherein before the storing the to-be-processed data in the public buffer card, the method further comprises:
applying for a storage space in the public buffer card, wherein the storage space is used to store the to-be-processed data.

15. The method according to claim 14, wherein there are multiple co-processing request messages, and the allocating the to-be-processed data stored in the public buffer card to the idle co-processor card in the computer system for processing comprises:
obtaining request priority and a request type of each co-processing request message from each co-processing request message;
according to the request priority and request type of each co-processing request message, determining processing order of to-be-processed data corresponding to each co-processing request message; and
allocating, in sequence and according to the processing order, the to-be-processed data from the public buffer card to the idle co-processor card in the computer system for processing, wherein the to-be-processed data corresponds to each co-processing request message.

16. The method according to claim 15, wherein the method further comprises:
storing data at a destination address designated by the co-processing request message, wherein the data has been completely processed by the idle co-processor card.

17. The method according to claim 16, wherein after the allocating the to-be-processed data stored in the public buffer card to the idle co-processor card in the computer system for processing, the method further comprises: erasing the to-be-processed data from the public buffer card.

18. The method according to claim 17, wherein the storing the to-be-processed data in the public buffer card specifically comprises:
adopting a DMA manner to store the to-be-processed data in the public buffer card.

19. The method according to claim 18, wherein the public buffer card is a PCIE buffer card.

20. The method according to claim 19, wherein the co-processor card is a PCIE co-processor card.

21. The method according to claim 20, wherein the PCIE co-processor card is a GPU acceleration card.

22. A co-processing task management apparatus, comprising:
a message receiving module, configured to receive a co-processing request message sent by a compute node in a computer system, wherein the co-processing request message carries address information of to-be-processed data, and the to-be-processed data is data on which processing is requested by the compute node;
a first data transfer module, configured to, according to the address information which is of the to-be-processed data and carried in the co-processing request message, obtain the to-be-processed data, and store the to-be-processed data in a public buffer card, wherein the to-be-processed data is data on which processing is requested by the co-processing request message; and
a second data transfer module, configured to allocate the to-be-processed data stored in the public buffer card to an idle co-processor card in the computer system for processing.

23. The apparatus according to claim 22, wherein the second data transfer module is further configured to
store data at a destination address designated by the co-processing request message, wherein the data has been completely processed by the idle co-processor card.

24. The apparatus according to claim 23, wherein the apparatus further comprises:
a buffer management module, configured to, before the to-be-processed data is stored in the public buffer card, apply for a storage space in the public buffer card, wherein the storage space is used to buffer the to-be-processed data.

25. The apparatus according to claim 24, wherein the second data transfer module comprises:
an obtaining unit, configured to, when there are multiple co-processing request messages, obtain request priority and a request type of each co-processing request message from each co-processing request message;
a request order determining unit, configured to, according to the request priority and request type of each co-processing request message, determine processing order of to-be-processed data corresponding to each co-processing request message; and
a data processing unit, configured to allocate, in sequence and according to the processing order, the to-be-processed data from the public buffer card to the idle co-processor card in the computer system for processing, wherein the to-be-processed data corresponds to each co-processing request message.

26. The apparatus according to claim 25, wherein the first data transfer module stores the to-be-processed data in the public buffer card in a DMA manner.

27. An acceleration management board, comprising:
a controller; and
a PCIE interface unit, wherein
the controller is coupled in data connection to a bus exchanger of a computer system through the PCIE interface unit,
the controller is configured to
receive a co-processing request message sent by a central processing unit CPU of the computer system, the co-processing request message carrying address information of to-be-processed data, and the to-be-processed data is data on which processing is requested by the CPU, according to the address information which is of the to-be-processed data and carried in the co-processing request message, obtain the to-be-processed data from a hard disk in the computer system, store the to-be-processed data in a public buffer unit, and allocate the to-be-processed data stored in the public buffer unit to an idle GPU acceleration card in the computer system for processing, and the GPU acceleration card is connected, through its own first PCIE interface, to the bus exchanger of the computer system.

28. The acceleration management board according to claim 27, wherein the public buffer unit is located inside the acceleration management board.

29. The acceleration management board according to claim 27, wherein the public buffer unit is located outside the acceleration management board, the public buffer unit is a PCIE buffer card, the PCIE buffer card comprises a second PCIE interface, and the PCIE buffer card is connected, through the second PCIE interface, to the PICE interface unit.

* * * * *

UNITED STATES PATENT AND TRADEMARK OFFICE
CERTIFICATE OF CORRECTION

PATENT NO. : 8,478,926 B1  
APPLICATION NO. : 13/622422  
DATED : July 2, 2013  
INVENTOR(S) : Zhang et al.

Page 1 of 1

It is certified that error appears in the above-identified patent and that said Letters Patent is hereby corrected as shown below:

On the Title Page Item [71] (Applicant), Line 2, delete "Guangdong" and insert -- Shenzhen --, therefor.

In the Claims

Column 21, Line 20, in Claim 29, delete "PICE" and insert -- PCIE --, therefor.

Signed and Sealed this  
Twenty-ninth Day of July, 2014

Michelle K. Lee  
*Deputy Director of the United States Patent and Trademark Office*